Feb. 29, 1944. C. B. HALE 2,343,110
PRELOADED GEAR
Filed Oct. 30, 1942 2 Sheets-Sheet 1

Inventor:
Charles B. Hale,
By Wm. F. Freudenreich
Attorney.

Feb. 29, 1944. C. B. HALE 2,343,110
PRELOADED GEAR
Filed Oct. 30, 1942 2 Sheets-Sheet 2
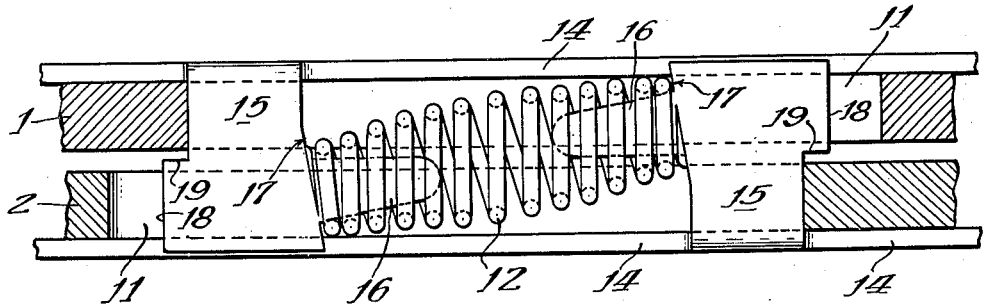
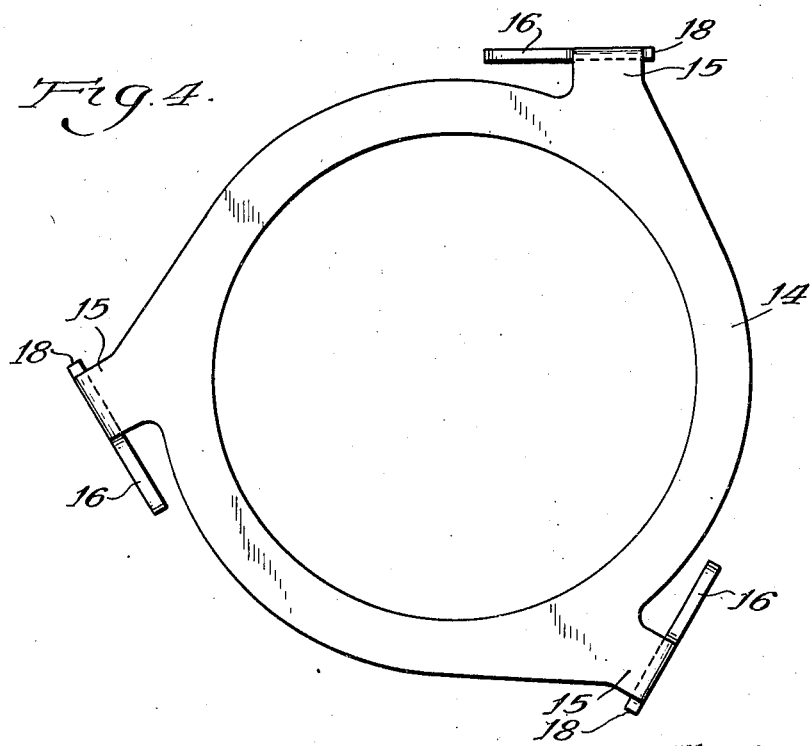
Inventor:
Charles B. Hale,
By Wm. F. Freudenreich,
Attorney.

Patented Feb. 29, 1944

2,343,110

UNITED STATES PATENT OFFICE 2,343,110

PRELOADED GEAR

Charles B. Hale, Chicago, Ill., assignor to Gear Specialties, a copartnership composed of Herman B. Gardner, Elsie Marie Gardner, Elmer H. Johnson, Elsie M. Johnson, Conrad N. Petersen, and Jennie Petersen, all of Chicago, Ill.

Application October 30, 1942, Serial No. 463,968

5 Claims. (Cl. 74—440)

In my prior application, Ser. No. 422,606, I have disclosed a novel pre-loaded worm gear construction for the purpose of avoiding lost motion between the worm and the worm wheel. In order to carry out this purpose the worm wheel is divided into two sections on a central plane at right angles to the axis of the wheel and such sections are connected by tension springs that permit limited relative rotary movements against the resistance of the springs.

One of the objects of the present invention is to simplify and generally improve my prior construction.

In my old form of pre-loaded worm wheel the two sections do not always remain in intimate contact with each other throughout their meeting faces, while the wheel is being driven. This is particularly true when only a single spring is used in each wheel, so that the driving force is multiplied through a lever action great enough to cause a very slight separation of the sections in those areas that are remote, angularly considered, from the spring. While such separation may be a negligible factor, so far as most uses are concerned, it is a definite disadvantage in cases where there should be no departure from perfection. Considered in one of its aspects, the present invention has for its object to insure that the two wheel sections shall be held initially and remain in perfect contact with each other throughout the entire three hundred and sixty degree angle of the wheel.

Figure 1:
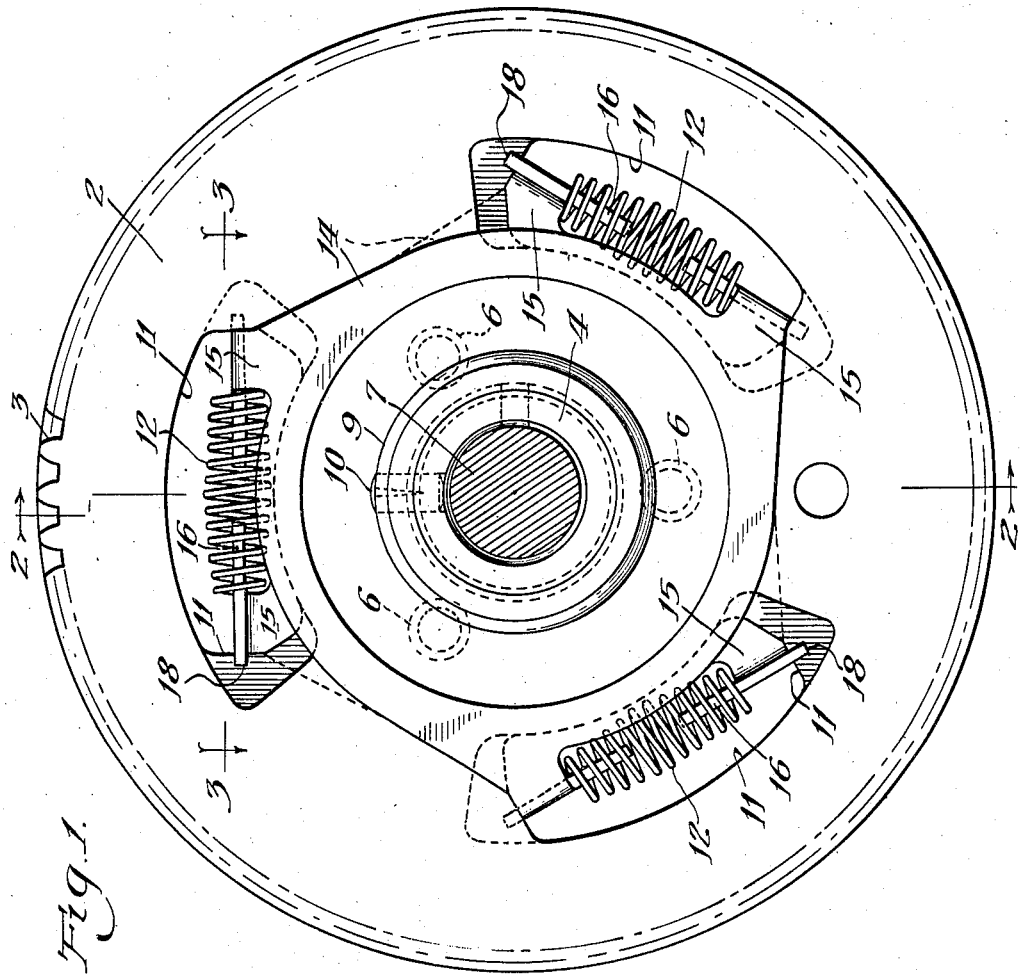
Figure 2:
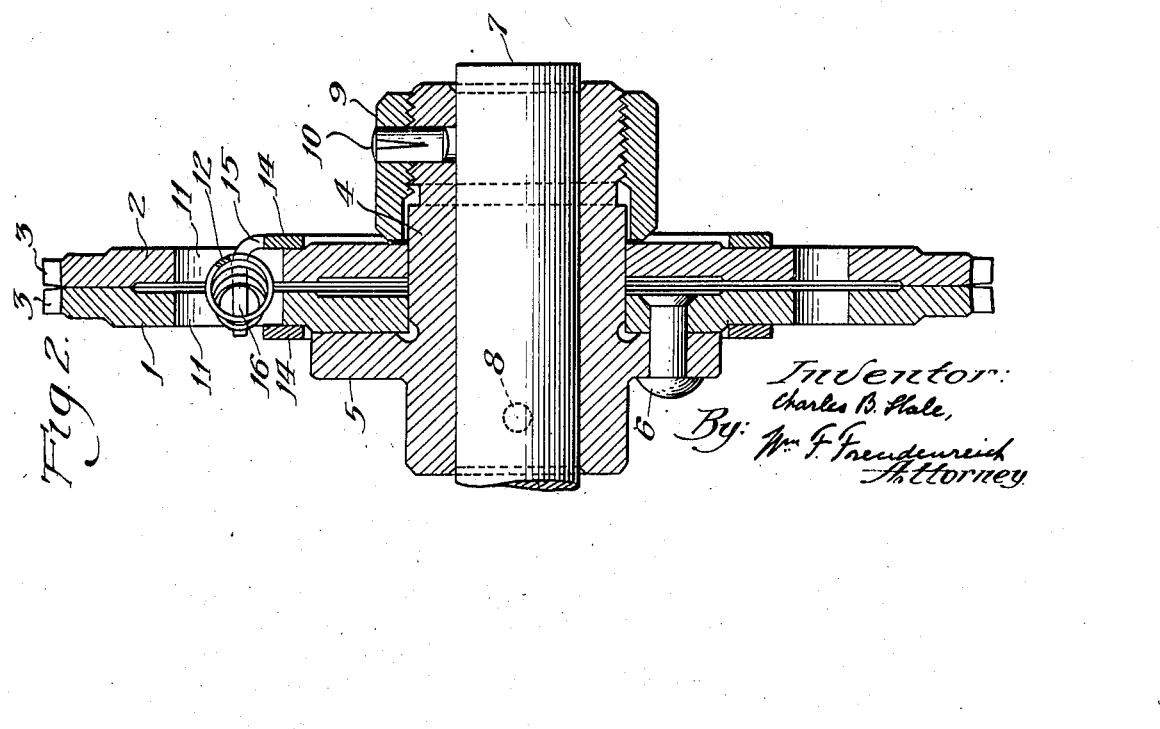

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a worm wheel embodying the present invention, the relative positions of the sections being those which exist at the time the wheel meshes with the worm; Fig. 2 is a section of line 2—2 of Fig. 1; Fig. 3 is a section, on a larger scale, taken on line 3—3 of Fig. 1, the hub member being omitted; Fig. 4 is a side view of one of the abutment-carrying rings, or spiders, on the same scale as Fig. 1; and Fig. 5 is an edge view of the ring or spider in the region of one of the lugs thereon.

Referring to the drawings, 1 and 2 are two like disk-like sections placed together with corresponding faces in contact with each other and being, therefore, symmetrically disposed with respect to a central plane. Around the periphery of each wheel section are gear teeth 3. Both disk-like sections surround a sturdy cylindrical hub 4 provided with an external flange 5 against which one of the sections bear. This latter section, which is section 1, is fixed to the flange by means of any desired number of rivets 6, while the section 2 is a rotating fit on the hub. The hub surrounds and is fastened to a driving shaft 7 in a suitable way as, for example, by a pin 8. The section 2 is prevented from accidentally slipping off the hub by a sleeve nut 9 screwed upon the hub and extending into the vicinity of, but preferably not in contact with, the section 2. This nut may be locked to the hub by a pin 10.

Each of the members 1 and 2 is provided with a plurality of elongated arc-shaped windows 11, preferably three such windows, as shown; all of the windows being alike. The two sections are so placed, relatively to each other, angularly of the axis, that corresponding windows therein register with each other. Within each pair of registering windows is a strong compression spring 12. The longitudinal axes of the slot-like windows are all on the same circle concentric with the wheel, and the longitudinal axes of the springs are disposed approximately in planes tangential to this circle and at right angles to radii passing through the windows midway between the ends of the latter. The springs extend more or less diagonally through both windows of the corresponding pair. Also, the springs are preferably of the barrel type, wherein the diameter decreases from the middle toward both ends. This arrangement permits the springs to lie at a maximum angle to the plane of division of the wheel without protruding beyond the outer faces of the wheel.

Each wheel section is provided with lugs which reach over into the windows in the other section and there engage with the ends of the corresponding springs; all of the lugs on one section engaging with what then may happen to be the trailing ends of the springs, while the lugs on the other section engage with the ends of the springs which at that time happen to be the advance ends. The springs are preferably under an initial compression sufficient to cause them to hold the two lugs in each pair of windows at the extreme ends of both windows when the wheel is not in engagement with the worm. Then, when the worm is to be placed in driving relation to the wheel, the two sections are simply shifted relatively to each other in a direction further to compress the springs and make room between the gear teeth for the worm. After this has been done only the worm prevents the springs from again expanding, except to the extent necessary to maintain contact between the faces of the worm and the gear teeth. In other words, as shown in Fig. 3, which represents a normal driving condition, there is always room for expansion of the springs beyond an amount necessary to prevent lost motion between the worm and the gear teeth.

With the springs and lugs disposed in the manner described, the force exerted by the springs may be resolved into two components, one parallel and the other at right angles to the plane of division of the wheel. The first of these components causes relative rotary movements between the two sections when free to do so. The second component acts solely to draw the two sections together. Since there are three springs, uniformly distributed about the axis of the wheel, their clamping action on the sections is effective to maintain intimate contact between all parts of the meeting bearing faces of the wheel sections in all angular positions of the wheel.

While the lugs or abutments with which the springs cooperate may be mounted in any desired way on the wheel sections, so far as the principle of operation is concerned, this can be accomplished advantageously by employing a pair of spiders each of which carries one of the groups or set of lugs. Such an arrangement is utilized in the construction illustrated.

Each spider consists of a ring 14 from the periphery of which three lugs 15 project. These lugs are roughly L-shaped, each long arm merging at one end into the periphery of the ring and being bent laterally between its ends to bring the short arm 16 of the L out to one side of and spaced apart from the ring. The short arm 16 serves as a finger or pin to enter one end of a spring and center the latter. The part of the long arm of the L that lies crosswise of the plane of the ring has an edge 17 inclined to that plane at such an angle as to be positioned at right angles to the long axis of the spring with which it engages. Each lug has a rearwardly projecting heel portion 18 that forms a shoulder 19 spaced apart from the plane of the ring a distance somewhat greater than the thickness of metal in the disks or wheel sections at the slots or windows.

The spiders may be made from any suitable material and may be manufactured in any desired way, preferably by punching them out of sheet metal and bending the lugs in forming dies.

In assembling the parts of a wheel, one of the rings or spiders is placed against the outer face of each section, with its lugs extending through corresponding ends of its windows into the windows of the other section. When the springs are engaged with the centering fingers as shown in Fig. 3, they draw the rings toward each other in the manner of the jaws of a clamp, while expanding as far as the windows and the lugs will permit. As soon as the springs exert a pressure on the lugs, the heel 18 of each lug moves behind the inner side of the wheel section against which the ring element of the corresponding spider rests, as best shown in Fig. 3, so that the spiders cannot be pushed or drawn away from the sides of the wheel. Of course, when the wheel is not in mesh with a worm, the springs drive the lugs of each cooperating pair apart until each strikes metal at the adjacent end of each of the two windows in which it lies. This does not, however cause the lugs to become unhooked from their respective wheel sections, since the windows in one section simply remain displaced a little relatively to each other angularly of the wheel. When the wheel sections are shifted to bring a worm in mesh with the gear teeth, the heels 18 of the lugs move away from edges of the slots with which they previously engaged, as shown in Figs. 1 and 3, the interlocking hook connection between each wheel section and its spider being maintained. Consequently, after a wheel assembly has once been made, the spiders cannot become separated from the wheel unless the springs are deliberately compressed sufficiently to allow the lugs to be unhooked.

It will thus be seen that I have produced a construction which consists of a few simple parts all of which are sturdy and not likely to break or wear out during an indefinite period of use. Thus, the springs require no hooked ends or other fastening means that may break or otherwise fail at almost any time; there are no small holes to be drilled to receive spring ends; the two wheel sections are duplicates of each other, except that one contains rivet holes; and the spiders are duplicates of each other as are also the springs. Therefore, not including the hub, there are only three different pieces required, two such pieces each being in duplicate and the third being in triplicate; from which it follows that the cost of manufacturing the necessary parts is low. Also, since no fastenings are required for the wheel proper, the assembly of the latter is simple, easy and can be quickly effected. Therefore, my improved wheel is simple, durable, efficient and reliable in operation and, at the same time, is inexpensive.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a gear wheel divided into two sections on a plane at right angles to its axis, each section having three windows distributed about said axis and registering with corresponding windows in the other section, a compression spring arranged in each pair of registering windows with its longitudinal axis extending transversely of a wheel radius intersecting the spring and having its axis at an angle to and crossing said plane, and abutments for the ends of each spring, each abutment extending from one section into a window of the other section and there engaging the adjacent end of the corresponding spring, the surface of the abutments that are in engagement with the ends of a spring being at right angles to the axis of the spring.

2. In combination, a gear wheel divided into two sections on a plane at right angles to its axis, each section having a plurality of windows distributed about said axis and registering with corresponding windows in the other section, rings positioned on opposite sides of and coaxial with the wheel, lugs projecting laterally from each ring and extending approximately across the entire thickness of the wheel, and compression springs lying between and engaged with the free ends of the lugs with their axes extending diagonally across said plane, and the springs tending constantly to force the two lugs in each pair of windows into the opposite ends thereof.

3. In combination, a gear wheel divided into two sections on a plane at right angles to its axis, each section having three windows distributed about said axis and registering with corresponding windows in the other section, rings positioned on opposite sides of and coaxial with the wheel, lugs projecting laterally from each ring and extending approximately across the entire thickness of the wheel, compression springs lying between and engaged with the free ends of the lugs and tending constantly to force the two lugs in each pair of windows into the opposite ends thereof, each lug having a shoulder to engage with the inner face of the wheel section through which the lug first passes when the lug lies in the extreme end of the window in that section, and the windows being of such lengths that during use of the wheel the windows of each pair are displaced relatively to each other far enough to allow each lug to lie in the extreme end of the section with which its ring engages.

4. In combination, a gear wheel divided into two sections on a plane at right angles to its axis, each section having a plurality of windows distributed about said axis and registering with corresponding windows in the other section, rings positioned on opposite sides of and coaxial with the wheel, lugs projecting laterally from each ring through the middle of the windows across approximately the entire thickness of the wheel, and compression springs lying between and engaged with the free ends of the lugs and tending constantly to force the two lugs in each pair of windows into the opposite ends thereof, each lug having a projection entered into the adjacent end of the corresponding spring.

5. In combination, a gear wheel divided into two sections on a plane at right angles to its axis, each section having a plurality of windows distributed about said axis and registering with corresponding windows in the other section, rings, coaxial with the wheel, lying on opposite sides of and in engagement with the wheel, lugs projecting laterally from each ring and extending through said windows approximately across the entire thickness of the wheel, each lug being positioned at one end of the corresponding window in the wheel section engaged by the ring carrying that lug and having a shoulder overlapping the inner face of that section beyond the end of the window to hold the ring to the wheel, and compression springs lying between and engaged with the free ends of the lugs and tending constantly to force the lugs in each pair of windows into the extreme ends of the windows.

CHARLES B. HALE.